C. E. DUNLAP.
HEN'S NEST.
APPLICATION FILED SEPT. 27, 1910.
1,004,153.
Patented Sept. 26, 1911.
3 SHEETS—SHEET 1.
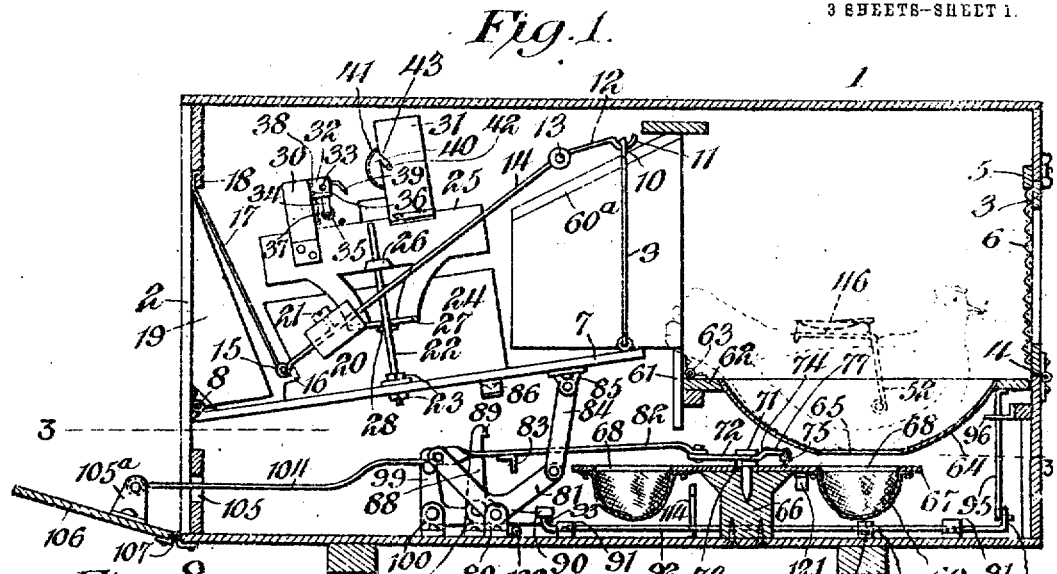
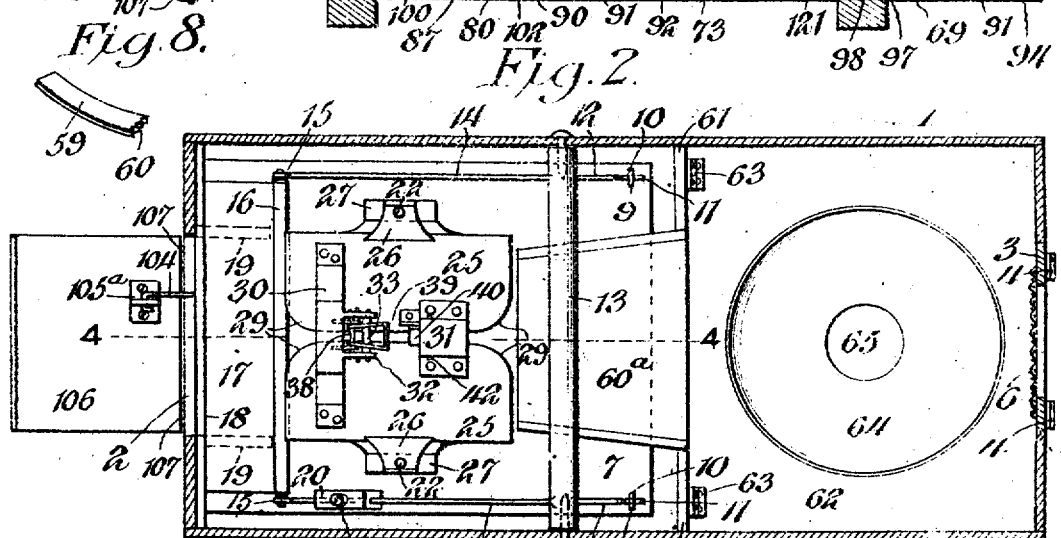
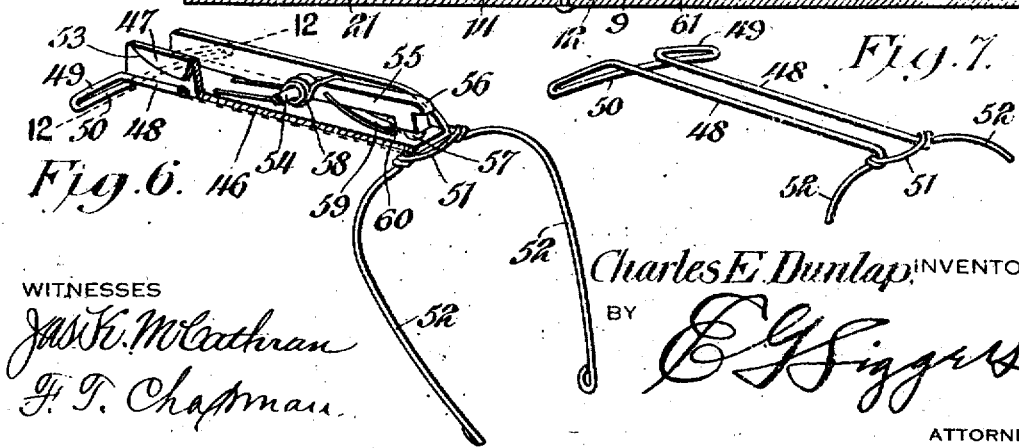
WITNESSES
Charles E. Dunlap, INVENTOR
BY
ATTORNEY

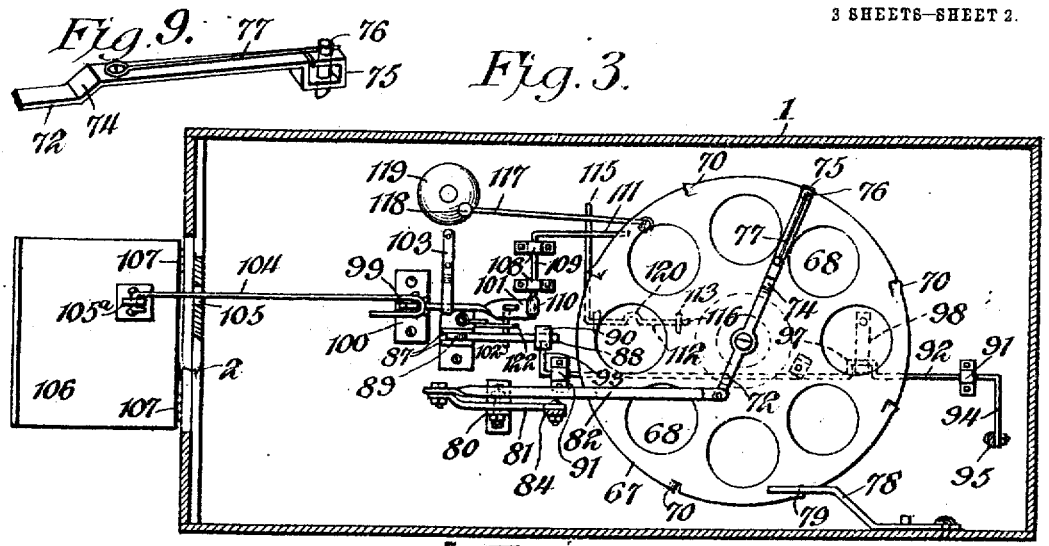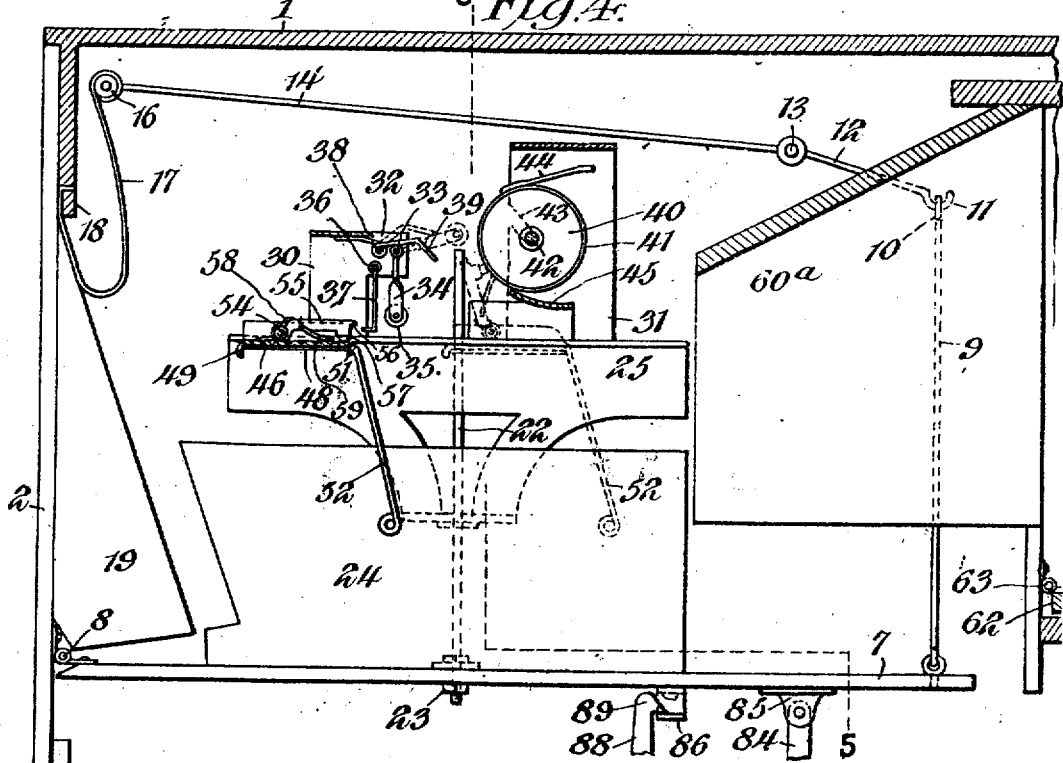

C. E. DUNLAP.
HEN'S NEST.
APPLICATION FILED SEPT. 27, 1910.
1,004,153.
Patented Sept. 26, 1911.
3 SHEETS—SHEET 3.
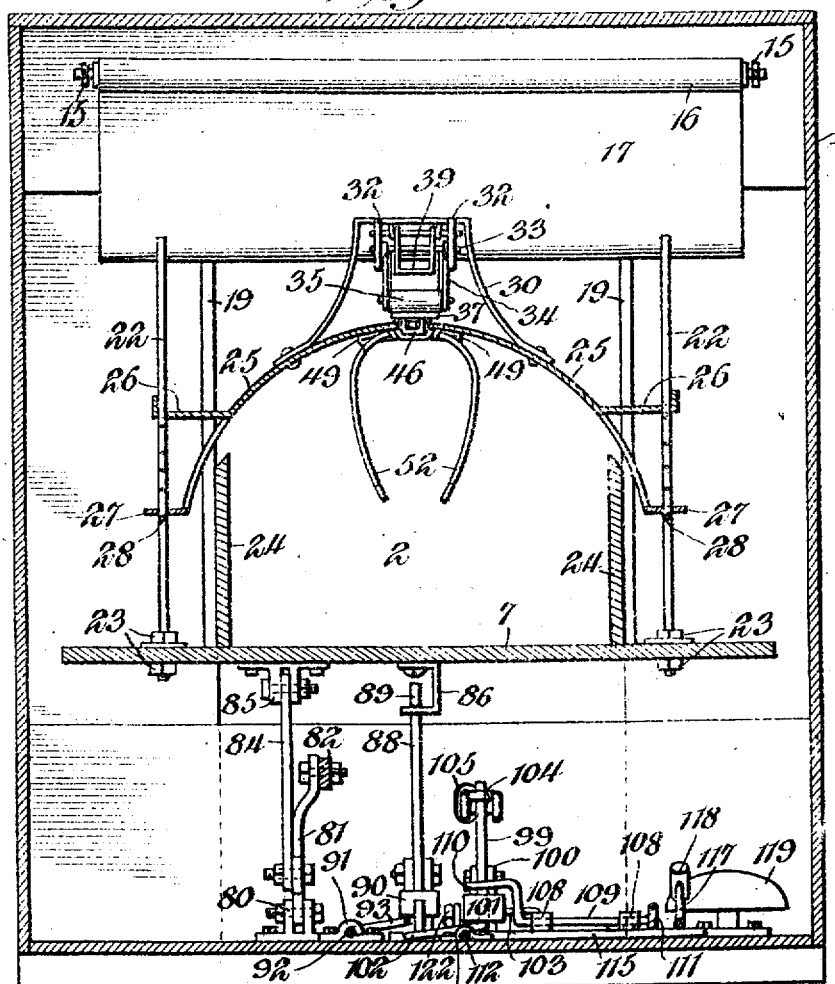
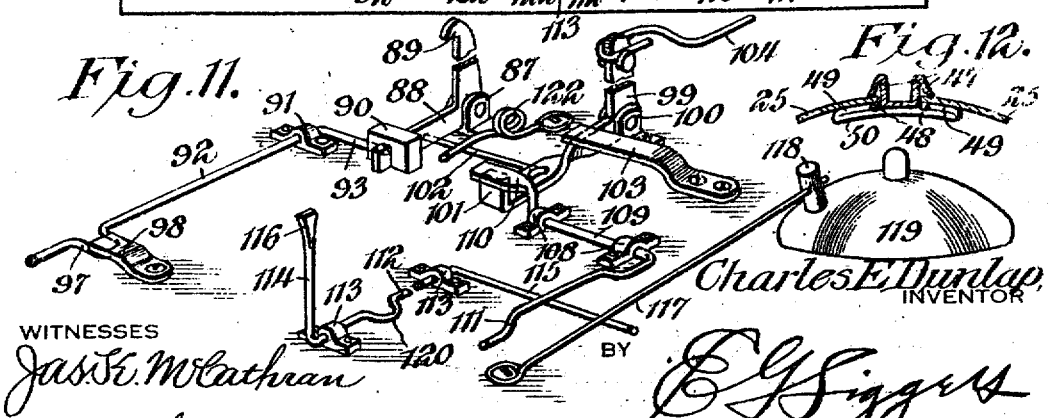
WITNESSES
Jas. E. McCathran
F. T. Chapman.
Charles E. Dunlap,
INVENTOR
BY
ATTORNEY

UNITED STATES PATENT OFFICE.

CHARLES EDGAR DUNLAP, OF ZANESVILLE, OHIO.

HEN'S NEST.

1,004,153.

Specification of Letters Patent. Patented Sept. 26, 1911.

Application filed September 27, 1910. Serial No. 584,143.

*To all whom it may concern:*

Be it known that I, CHARLES E. DUNLAP, a citizen of the United States, residing at Zanesville, in the county of Muskingum and State of Ohio, have invented a new and useful Hen's Nest, of which the following is a specification.

This invention has reference to improvements in poultry nests, and its object is to provide a nest whereby automatic registration of the hens laying the eggs is brought about.

It is often desirable to have a record of the laying capacity of individual hens, and this is brought about with the present invention by causing each hen entering the nest to produce a record which will indicate the particular hen entering the nest and each egg laid is received in a compartment individual thereto, so that by consulting the record the particular egg laid by a particular hen is readily ascertained.

The invention will be best understood from a consideration of the following detailed description taken in connection with the accompanying drawings forming a part of this specification, with the understanding, however, that while the drawings illustrate an operative structure capable of carrying out the purposes of the present invention, various modifications in the structure and changes in the location of parts may be made without departing from the invention, and, therefore, the invention is not confined to the particular showing of the drawings.

In the drawings:—Figure 1 is a central longitudinal vertical section of the nest structure with some parts shown in elevation and with the parts in the position assumed when a hen is on the nest. Fig. 2 is a plan view of the structure with the casing in horizontal section. Fig. 3 is a section on the line 3—3 of Fig. 1. Fig. 4 is a section on the line 4—4 of Fig. 2 but drawn to a larger scale and with the parts in the position assumed when a hen has entered the nest structure, but before the nest is reached. Fig. 5 is a section on the line 5—5 of Fig. 4 and continuing through the bottom of the casing. Fig. 6 is a perspective view with parts broken away of the saddle structure to be applied to the hen. Fig. 7 is a perspective view of a portion of the structure of Fig. 6. Fig. 8 is a perspective view of another portion of the structure of Fig. 6. Fig. 9 is a perspective view of the impelling end of the actuator for the egg carrier. Fig. 10 is a perspective view of the back stop pawl structure for the egg carrier. Fig. 11 is a perspective view of the latch and other mechanisms located beneath the actuating board. Fig. 12 is a section on the line 12—12 of Fig. 6.

Referring to the drawings, there is shown a casing 1 indicated as of general rectangular shape in cross section in any direction, but the particular shape of the structure is immaterial. At one end the casing is provided with an opening 2, and at the other end with another opening normally closed by a rectangular frame 3 connected to the casing at the opening by hinges 4 and held to the casing at the edge remote from the hinges by a suitable button 5. The frame 3 may be covered with wire netting 6 or any other means for the introduction of light and air to the interior of the casing at this point may be provided.

Within the casing 1 there is a platform 7 connected at one end by hinges 8 to the end wall of the casing, where is located the opening 2. The other end of the platform 7, that is the end remote from the hinges 8, has secured thereto on opposite sides links 9, the upper end of which are formed with eyes 10 engaging hooks 11 formed on the ends of rock arms 12 projecting from a rock shaft 13 journaled at the ends in the sides of the casing 1. Projecting from the rock shaft 13 on the side thereof opposite from the arms 12 are other rock arms 14 extending to near the inner wall of the end of the casing through which is formed the opening 2. The free ends of the arms 14 may be formed into eyes 15 or may be otherwise shaped to sustain a bar 16 carrying one end of a flexible curtain 17, the other end of which is made fast to the inner wall of the corresponding end of the casing in any suitable manner, as by a clamp bar 18, and this curtain is of a length to cover the opening 2 when the curtain is fully extended. Since the bar 16 moves in an arc about the axis of the shaft 13 as a center, the ends of the arms 14 when in the lower position are more removed from the end of the casing than when in the upper position, the rock shaft 13 being located near the top of the casing. In order to close in the space between the opening 2 and the curtain 17 when in the lowered position, side wings 19 are provided flanking the opening 2 and extending an appropriate distance into the casing, these wings being wide at the bottom and narrow at the top to conform in general to the position of the curtain when extended, and yet not interfering with the raising of the curtain by the upward movement of the free ends of the arms 14, the curtain then folding on itself, as indicated in Fig. 4. The normal tendency of the platform is toward the raised position, and this is caused by a weight 20 which may be made fast to one of the arms 14 in adjustable relation thereto by means of a set screw 21. Usually a single weight is ample, but this does not preclude the use of more than one weight, and the application of the weights to both arms 14 if such be desirable, or any other means for imparting to the platform 7 an upwardly tendency may be employed.

Fast to the platform 7 between the ends thereof and on opposite sides of the center line of the platform are rods 22 which may be made rigid with relation to the platform by nuts 23 applied to each rod above and below the platform. Also, made fast to the platform adjacent to but nearer the center line of the platform than are the rods, are side members 24 serving as guides to direct a hen moving along the platform after entering the casing through the opening 2, toward the other end of the platform. Each rod 22 carries a crown sheet 25, these crown sheets being appropriately bent so that the edges remote from the rods overhang the portion of the platform between the side members 24 in elevated relation to the upper surface of the platform and said side members. The crown plates are each supported on a respective rod by spaced brackets 26, 27, each provided with a passage for its rod, and a pin 28 in traversing relation to each rod and underriding the bracket 27 serves to hold the respective crown plate in the desired elevated position with respect to the platform. By providing each rod 22 with a suitable number of spaced perforations, the pins 28 may be introduced into any desired ones of the perforations to effect the adjustment of the crown plates to accommodate the device to fowls of different heights. The meeting edges of the crown plates are rounded one away from the other at their ends, as indicated at 29, but these meeting edges do not come into actual contact, being spaced a short distance one from the other, and there held by connecting yokes 30, 31, respectively, near the ends of the crown plates and each shaped to support certain mechanism to be described. The yoke 30 is provided with spaced parallel wings 32 between which extends a pivot pin 33 carrying a pendent arm 34 journaled in the lower end of which is a roller 35 which may be of suitable material to carry a marking ink. The wings 32 also carry another pivot pin 36 from which there hangs a hook-shaped plate 37. The wings 32 also carry still another pin 38, on which is mounted a yoke like spring 39 in the path of the pendent arms 34, so that when these arms with the roller 35 are swung upwardly about the pin 33 in a manner to be described, they will ultimately engage the spring 39 and move the same against its normal tendency, this spring when the arms 34 are released tending to move it toward its initial position.

Mounted in the yoke 31 is a roller 40 which may have its periphery covered with a layer 41 of suitable material, such as paper, capable of receiving an imprint. Since it is desirable to remove the roller 40, it is provided with a journal 42, the ends of which are adapted to enter inclined recesses 43 in the legs of the yoke, and the roller is held against accidental displacement by a spring finger 44 bearing thereon in a direction to hold the journal 42 in the recessed bearings therefor. Underriding the roller is a guard plate 45 with one edge in close relation to the roller, and the body of the guard plate curving away from the roller.

Each hen is provided with a saddle structure comprising a channel member 46 of sufficient length with the upper edges 47 returned on themselves. The channel member is received between two wire members 48 in spaced relation one to the other, and at one end these wire members are bent oppositely at an angle to the main portion of the wires, as shown at 49, and then have a return connecting member 50 joining the outer ends of the bent portions, the members 48, 49 and 50 being preferably formed of one piece of wire, although this does not preclude the formation of these structures otherwise. The other ends of the wire members 48 are coupled together by a connector 51, and beyond this the wire members diverge and then converge to form gripping fingers 52 designed to embrace the body of the fowl adjacent the junction of the wings of the fowl with the body thereof, while the channel member 46 rests upon the back of the fowl. The connectors 50 and 51 serve to support the ends of the channel member, while the wire members 48 grip the channel member and the return edges 47 terminate in spaced relation to the wire members 48, so that the return members 47 may override the crown plates 25 and the wire members 48 may underride these plates at the spaced meeting edge portions thereof, the several parts being suitably proportioned for this purpose, and the ends of the inturned edges 47 being suitably rounded as indicated at 53 so as to coact with the rounded edges 29 of the crown plates 25 to guide the saddle into proper relation to the crown members 25.

While there may be considerable difference in height between fowls of different breeds, selected fowls of the same breed are all of approximately the same height, and the crown plates 25 may, therefore, be adjusted in a suitable position and the device being used with hens of practically all the same height, a hen entering the nest structure through the conduit defined by the side members 24 and crown plates 25 will bring the saddle member into proper relation to the crown plates so that the latter will engage the saddle member between the downturned edges 47 and the wires 48, and these crown plates will guide the saddle during the subsequent operations.

The channel member carries a pin 54 in traversing relation thereto, and on this pin is pivoted an arm 55 having its free end formed with a tooth 56 in line therewith and also at the free end carrying an imprinting member 57. Surrounding the pin 54 and overriding the arm 55 and having its ends engaging the bottom of the channel member 46 is a spring 58 tending to maintain the arm 55 with the imprinting member 57 in engagement with the bottom of the channel member. Fast to the arm 55 is a finger 59 having one end secured to the arm and the other projecting into close relation to the imprinting member 57 and there formed with teeth 60.

If it be assumed that a hen with the saddle attached enters the nest casing through the opening 2, the saddle will be brought into such relation to the crown plates 25 as to be engaged by the spaced meeting edges thereof and be directed by these edges along said plates, the initial position of the saddle with relation to the plates being indicated in Fig. 4. As the hen moves along the platform 7 away from the opening 2, the tooth 57 is ultimately brought into engagement with the hook plate 47 and further movement of the saddle will cause a lifting of the arm 55 about its hinge pin 54 because of the changing relation of the saddle to the pivot pin 36 carrying the plate 37. The parts are so proportioned that ultimately the imprinting member 57 is brought into engagement with the inking roller 35 and the latter is brought into engagement with the spring 39 and the roller and imprinting member are pressed together sufficiently to cause a transfer of ink to the printing member. At the same time the arm 55 is given a sufficient backward inclination to cause the tooth 56 to escape from the hook 37 and the spring 58 impels the arm 55 onto the impression receiving surface 41 so that an imprint is made thereon. Simultaneously with the imprinting the toothed finger 59 engages the surface 41 and further movement of the saddle causes a rotative movement of the roller 40 until ultimately the guard plate 45 is reached, and then the arm 55 is moved away from the roller 40, the finger 59 participating in this movement, and this finger protects the imprinting member 57 from engagement with the guard plate. When the guard plate is passed, the spring 58 returns the arm 55 to its initial position within the channel member 46, an imprint having in the meantime been produced upon the surface 41 of the roller 40.

By having the imprinting members 57 characteristically different for the different hens, different numerals or letters being sufficient, each hen on entering the nest structure will cause an imprint individual to the hen to be produced upon the surface 41, so that subsequent inspection will show what hens have visited the nest. The narrowness of the conduit and the engagement of the saddle with the crown plates prevents the hen from turning back, so that the hen must proceed as far as the nest, which, as will hereinafter appear, is beyond the crown plates.

In line with the crown plates is a hood 60ª formed of side and top members and extending away from the crown plates, this hood being supported by side strips 61 fast to the sides of the casing and sufficiently distant from the end of the casing carrying the frame or window 3 to form a nest compartment. Within this compartment there is located a frame 62 at a suitable distance above the bottom of the casing, and at one edge connected by hinges 63 to the side strips 61. This frame 62 is provided with a central depressed portion or bowl 64 constituting the nest for the hen, and usually this bowl may be provided with some soft lining material. Through the bottom of the bowl there is provided a passage 65 designed for the escape of eggs laid in the nest.

Where the nest is provided with a padding or other soft material, cleansing of the nest should be rendered easy, and for this purpose the hinges 63 may be omitted and the nest frame may then be readily removed when desired without the necessity of using tools.

Erected on the bottom of the casing below the nest compartment and to one side of the center of the nest is a post or standard 66, on top of which is pivoted a disk 67 provided with a circular series of perforations 68, the relation of the post 66 and the pivot of the disk being such that these perforations may be brought in succession beneath the pasage 65 in the nest bowl. In order to receive and retain eggs passing from the nest bowl, the disk 67 at each perforation 68 is provided with a receptacle 69 of some flexible material which will arrest the fall of an egg from the nest bowl without injury to such egg, and at the same time of sufficient capacity to hold the egg below the surface of the disk 67. Such receptacle 69 may be made fast to the disk 67 or may be removably mounted thereon. About the edge of the disk 67 are teeth 70 which may be made of the material of the disk by suitably punching the same. There is provided one tooth 70 for each passage 68, so that a suitable impelling means engaging the teeth in succession will cause a step by step rotative movement of the disk to bring the receptacles 69 in succession into underlying relation to the passage 65 through the bowl 64.

In the particular structure shown in the drawings, the top of the standard 66 is expanded so as to provide a broad bearing and supporting surface for the disk 67, and this standard receives a pivot pin 71, about which the disk moves, and this pivot pin may be a headed pin to confine to the pivot a lever 72 for movement about the axis of the disk 67 on the pin 71, a washer 73 separating the lever from the disk. This lever is a lever of the first order. The lever is in overlying relation to the disk 67 and at one point in the longer arm of the lever it is bent away from the disk, as indicated at 74, see Fig. 9, so that the outer extremity of the arm is more distant from the face of the disk than the portion of the arm adjacent the pivot of the lever. The outer end of the raised portion of the arm is bent into a return loop 75, through two parallel members of which are alined perforations for a dog 76 supported by a spring 77 fast at the end remote from the dog to the lever arm. The end 75 of the lever arm is so disposed as to override the teeth 70 in succession, and the dog 76 will move along the disk near the periphery thereof in engagement therewith with the spring 77 under stress, and when the dog reaches a tooth 70, which latter is depressed below the surface of the disk, the spring 77 forces the dog against the tooth so that the dog may be brought into engagement with the shoulder in the disk, formed by the depression of the tooth. Of course, this structure is more or less indicative of other drive mechanisms for the disk, and it is, therefore, to be understood that any structure suitable for the purpose may replace the impelling lever. By imparting a rocking movement to the lever, the disk will be rotated an appropriate distance in the proper direction, and when the lever is moved in the other direction it will ride idly over the disk into engagement with the next tooth in order, so that by a continuation of the rocking movement of the lever, the disk is rotated step by step. To prevent reverse movement of the disk 67, there is provided a back stop pawl 78 which may be in the form of a simple elastic strip fast at one end to one side of the casing, and at the other end formed with a tooth 79 adapted to the teeth 70 to hold the disk 67 while the reverse movement of the lever 72 is taking place, but yielding to the active movement of said lever, in which active movement the disk 67 participates.

Mounted on the bottom of the casing 1 is a bearing block 80 for a bell crank lever 81, to one arm of which there is connected one end of a link 82, the other end of which is connected to the short arm of the lever 72, and on this link is a stop piece 83. The other end of the lever 81 is connected by a link 84 to a bracket 85 on the under side of the platform 7. Whenever the platform 7 is depressed, motion is imparted by the link 84 to the lever 81, and from thence motion is imparted to the lever 72 by the link 82, this motion resulting in the active movement of the lever 72 to give rotative movement to the disk 77 a distance equal to the space between the centers of two adjacent perforations 68. When the platform 7 rises, the lever 72 is moved backwardly by the link and lever connection with the platform until the dog 76 is in engagement with the next tooth 70 in order.

Fast to the under side of the platform 7 is a keeper plate 86, and pivotally supported in a bearing member 87 on the bottom of the casing is a bell crank lever 88 having a normally upright arm terminating in a tooth 89 adapted to the keeper 86. The other arm of the lever 88 is provided with a weight 90 tending to hold the lever 88 in such position that when the platform 7 is depressed, the hook or latch end 89 will engage the keeper 86.

Mounted in spaced bearings 91 on the bottom of the casing is a shaft 92 having a radial arm 93 in position to engage under the weight 90 of the lever 88, and this rock shaft extends to a point beneath the nest frame 62, and terminates in a radial arm 94 connected to the free end of which is a rod or bar 95 having its free end engaging under that portion of the frame 62 adjacent to the frame 3, the rod 95 being guided by a guide plate 96 fast to the casing 1. At an intermediate point, the shaft is provided with a lateral bend 97, and engaging this bent portion 97 is a spring 98 fast to the casing, the spring acting to hold the shaft in such position that the rod 95 will then be in its highest position, the arm 94 being properly related to the shaft 92 for this purpose. When the nest frame 62 is depressed by the weight of a hen, such motion is imparted through the rod 95 to the shaft 92 to rock the latter in a direction against the action of the spring 98, and the arm 93 is so related to the shaft 92 that the weight 90 will be elevated, and since this weight and the lever 88 are fast one to the other, the said lever 88 will be rocked in a direction to carry a tooth 89 away from the keeper 86, thus releasing the platform 7 through the action of the weight 20, the tooth 89 when engaging the keeper 86 holding the platform 7 in the lower position.

Adjacent the lever 88 is another bell crank lever 99 carried by a journal block 100 fast to the bottom of the casing, and this lever has one end upturned, as shown at 101, the structure being most clearly illustrated in Fig. 11. The arm of the lever 99 having the upturned end 101 is provided with a lateral extension 102 underriding the weighted arm of the lever 88 and a spring 103 engaging that arm of the lever 99 having the upturned end 101 tends to normally hold this lever in one position. The other end of the lever 99 is connected to a link 104 extending through a perforation 105 in the end of the casing having the opening 2, and at the outer end is connected to a pivot plate 105ª fast to a platform 106 connected to the corresponding end of the casing exterior thereto by hinges 107, this platform being so related to the opening 2 that a fowl passing into or out of the casing will step upon the platform 106.

Mounted on the bottom of the casing by means of journal blocks 108 is a rock shaft 109 having a crank end 110 in normal overriding relation to the upturned end 101 of the lever 99. The other end of the shaft 109 is provided with a radial arm 111 which may be of sufficient weight to hold the shaft 109 in position with the crank end 110 overriding the end 101 of the lever 99. There is, also, provided another rock shaft 112 mounted in journal blocks 113 on the bottom of the casing, and at opposite ends of this shaft are arms 114 and 115 respectively, these arms being shown as at right angles one to the other, and in normal position the arm 115 lies near the bottom of the casing, while the arm 114 is upright, and the end of this arm 114 may be extended, as shown at 116. The arm 115 underrides the arm 111 on the shaft 109, and is in turn overridden by a spring bar 117 made fast at one end to the bottom of the casing, and at the other end provided with a striker 118 in position to engage a bell 119 mounted on the bottom of the casing. An offset portion 120 of the shaft 112 serves to prevent movement of the shaft beyond a certain distance in one direction, and, therefore, the arm 115 need not be in actual contact with the bottom of the casing, but may be engaged by the spring bar 117 which will tend at all times to hold the arm 114 in the upright position, but will yield to a force applied to the end 116 of the arm 114. Fast on the under side of the disk 67 is a finger 121 in position to engage the end 116 of the arm 114 once during each complete rotation of the disk 67, and the direction of movement of the finger 121 is such as to cause a rocking of the shaft 112 against the action of the spring bar 117, which rocking movement will act on the arm 111 to correspondingly rock the shaft 109 and carry the crank end 110 out of the path of the upturned end 101 of the lever 99, so that the latter is no longer locked by the crank end 110 and the lever 99 may thereby be moved under an appropriately applied force. As soon as the finger 121 escapes from the end 116 of the arm 114, the action of the spring rod 117 will return the shaft 112 to its normal position and the reaction of the spring rod 117 will carry the striker 118 in engagement with the bell 119, thus causing the sounding of said bell.

When the nest structure is ready for use, the platform 7 is in the depressed position in which it is held by the engagement of the hook end 89 of the lever 88 with the keeper 86, and the crank end 110 of the rock shaft 109 is in overriding relation to the end 101 of the lever 99. The nest frame 62 is also in the elevated position because of the action of the spring 98 on the shaft 92. Furthermore, the curtain 17 is in the raised position, since this is the position assumed by the curtain when the platform 7 is in the lowered position.

Now, let it be assumed that a hen desiring to lay an egg enters the nest structure through the opening 2. The hen on stepping on the outside platform 106 does not affect this platform, since it is held against movement by the crank 110. The hen approaches the nest compartment through the passage defined by the side members 24, and the crown plates 25, and the imprinting member in the saddle carried by the hen is caused to operate in the manner already described, so that an impression characteristic of the hen entering the nest is made upon the record sheet 41, and then the hen proceeds through the hood 60 to the nest compartment and ultimately steps upon the nest, which yields slightly under the weight of the hen, and this yielding causes a rocking of the shaft 92 against the action of the spring 98 to rock the lever 88 to an extent sufficient to remove the hook 89 from the keeper 86, when the weight 20 becomes active to elevate the platform 7 and lower the curtain 17, so that no more hens may enter the nest structure while being occupied by the hen already present. When the egg is laid, it will gravitate from the nest through the passage 65 into the receptacle 69 then under the passage 65. The hen now passes out of the nest through the hood 60, this being the only way of passage from the nest compartment, and as soon as the weight of the hen acts on the platform 7, the latter is depressed, raising the curtain 17 and bringing the keeper 86 into engagement with the hook end 89 of the lever 88, thus locking the platform 7 in the depressed position, and the spring 98 acts as soon as the hen leaves the nest to again raise the nest to the elevated position. On the downward movement of the platform 7 the disk 67 is given a rotative movement in the manner already described to carry the filled receptacle 69 from beneath the opening 65 and to place the next receptacle in order under the passage 65. The parts remain in this position when the hen leaves the nest and the device is ready for the entrance of another hen. The operations described are repeated for each hen, and each hen entering the device leaves a record upon the record sheet 41 characteristic of the particular hen. Ultimately the capacity of the device is reached, and when the last hen in order reaches the platform 7 the downward movement of this platform causes a rotative movement of the disk 67 which will bring the finger 121 into engagement with the end 116 of the arm 114, causing a rocking of the shaft 112 in the direction to actuate the shaft 109 so as to move the crank 110 out of the path of the upturned end 101 of the lever 99 and to raise the striker 118. The parts are so adjusted that a further movement of the disk 67 after the last depression of the platform 7 will carry the finger 121 past the end 116 of the arm 114, so that the latter is released and the return movement of the striker 118 causes the sounding of a signal, but the sounding of the signal only occurs when the poultryman is setting the device for use, and after the alarm sounds the disk 67 is moved backward until it stops, when the first pocket 69 in order is beneath the opening 65. The weight on the outside platform 106 causes a movement of the lever 99 sufficient to bring the upturned end 101 in such relation to the crank end 110 that when the arm 111 is released, the crank end 110 will no longer override the upturned end 101, but the full movement of the platform 106 is prevented by the spring 103. When the hen finally emerges through the opening 2 and steps upon the platform 106, the weight of the hen is sufficient to overcome the spring 103 and the lever 99 is further rocked to cause the extension 102 underriding the lever 88 to move the latter to an extent sufficient to release the keeper 86 from the hook end 89, so that the platform 7 will rise under the action of the weight 20 and lower the curtain. The nest structure is, therefore, closed to the entrance of other hens by the locking of the curtain which occurs on the last hen leaving the nest structure, so that should the poultryman not at once attend to the structure to reset it, no further use of the structure is permitted because of the lowering of the curtain.

By comparing the imprints on the record sheet 41 with the eggs in the receptacles 69, the eggs may be identified with the particular hens laying them.

To rest the apparatus, it is only necessary to remove the eggs from the receptacles 69 and to depress the platform 7, which will cause the raising of the curtain and then by lifting the outside platform 106 the lever 99 will move under the overbalancing action of the arm having the upturned end 101 which may be augmented by a light spring 122 engaging the extension 102, sufficiently to carry the end 101 out of the path of the crank 110, and the latter will then be moved by the rocking of the shaft 109 under the over-balancing action of the arm 111 into overriding relation to the end 101, thus locking the lever 99 and platform 106 in operative position, the disk 67 having been properly set as before explained.

What is claimed is:—

1. In a nest structure, a record receiving means within said structure, a record producing means attachable to the back of a fowl to be carried by said fowl into the nest structure, and guiding means for said record producing means within the nest structure, said guiding means and record producing means having coacting engaging members for positively directing the record producing means into operative relation to the record receiving means.

2. In a nest structure, a record receiving means therewithin in elevated relation to the walkway for a hen, an identifying record producing means to be carried by the fowl on the back thereof and individual to each fowl, and guiding means in operative relation to the record receiving means, said guiding means and record producing means having coacting members for positively directing the record producing means into engagement with the record receiving means.

3. In a nest structure, a record receiving means within the structure, an ink supplying means on the side of the record receiving means toward the entrance of the nest structure, and an imprinting means adapted to be attached to the body of the fowl in position to first engage the inking means and then engage the record receiving means on the passage of the fowl toward the nest.

4. In a nest structure, a record receiving means within said structure, an inking means also within the structure on the side of the record receiving means toward the entrance of the structure, an imprinting means adapted to be attached to and carried by a fowl, and guiding means within the structure for positively directing the imprinting means first to the inking means and then into operative relation to the record receiving means.

5. In a nest structure, a guiding walkway within the nest structure for directing a hen toward the nest, a record receiving means in superposed relation to the guiding walkway, an identifying record producing means adapted to be carried on the back of a hen, and a guide for said record producing means also in superposed relation to the guiding walkway, said guide and record producing means being provided with coacting engaging means for positively directing the record producing means into operative relation to the record receiving means.

6. In a nest structure, an identifying record producing means individual to a hen and adapted to be secured to the back of a hen, said record producing means including an imprinting element, a record receiving means within the nest structure, an inking means for the imprinting means also within the nest structure and on the side of the record receiving means toward the entrance of the nest structure, a guide for engaging the imprinting means and directing it first to the inking means and then to the record receiving means, and means for causing the imprinting means to deliver an impact blow on the record receiving means.

7. In a nest structure, record receiving means within said structure, and an attachment for fowls comprising a channel member having its edges returned on themselves to constitute guide members, a support for the channel member comprising a wire frame having side members receiving the channel member between them and constituting guide members coacting with the returned edges of the side members, the frame having one end formed by outturned portions of the side members, and a connecting yoke to rest on the back of a fowl and to support the corresponding end of the channel member, the other ends of the side members being bent into gripping portions designed to embrace the body of a fowl, and record producing means carried by the channel member.

8. In a nest structure, record receiving means within said structure, and an attachment for fowls comprising a channel member having its edges returned on themselves to constitute guide members, a support for the channel member comprising a wire frame having side members receiving the channel member between them and constituting guide members coacting with the returned edges of the side members, the frame having one end formed by outturned portions of the side members and a connecting yoke to rest on the back of a fowl and to support the corresponding portion of the channel member, the other ends of the side members being bent into gripping portions designed to embrace the body of a fowl, and record producing means carried by the channel member, said record producing means comprising a spring constrained arm pivoted in the channel member and provided with an imprinting member.

9. In a nest structure, record receiving means within said structure, and an attachment for fowls comprising a channel member having its edges returned on themselves to constitute guide members, a support for the channel member comprising a wire frame having side members receiving the channel member between them and constituting guide members coacting with the returned edges of the side members, the frame having one end formed by outturned portions of the side members, and a connecting yoke to rest on the back of a fowl and to support the corresponding end of the channel member, the other ends of the side members being bent into gripping portions designed to embrace the body of a fowl, and record producing means carried by the channel member, comprising a spring constrained arm pivotally mounted in said channel member with the free end formed with a projecting tooth, and also carrying an imprinting member, and a toothed finger carried by said arm.

10. In a nest structure, a drum adapted to receive a record sheet, guide members adjacent said drum, a carrier adapted to be attached to the body of a fowl, a pivotally mounted spring constrained imprinting member on said carrier, an inking roller carried by the guide members in the path of an imprinting member, an engaging member carried by the guide members in the path of the printing member, and means carried by the printing member for causing a movement of the holder for the record sheet coincident with the movement of the imprinting member when in engagement with the record sheet.

11. In a nest structure, a drum adapted to receive a record sheet, guide members adjacent said drum, a carrier adapted to be attached to the body of a fowl, a pivotally mounted spring constrained imprinting member on said carrier, an inking roller carried by the guide members in the path of a printing member, an engaging member carried by the guide members in the path of the printing member, means carried by, the printing member for causing a movement of the holder for the record sheet coincident with the movement of the imprinting member when in engagement with the record sheet, and means adjacent the record sheet holder for moving the imprinting member out of engagement therewith by a progressive movement of the carrier for the imprinting member.

12. In a nest structure, a guide conduit for fowls comprising side and crown members, said crown members having adjacent edges in spaced relation to form guides, record receiving means on said crown members, and a record producing means to be attached to a fowl and provided with guide means coacting with the guiding edges of the crown members.

13. In a nest structure, a conduit therein for fowls having adjustable crown members constituting guides, record receiving means on the crown members, and a record producing means to be attached to the body of a fowl and having guide means thereon coacting with the crown members to direct the record producing means into operative relation to the record receiving means.

14. In a nest structure, a conduit therein for fowls having adjustable crown portions with adjacent spaced edges constituting guides, a holder for a record sheet on said crown members, an inking means on said crown members, and an imprinting member provided with a carrier to be attached to the body of a fowl and having guide means coacting with the guide portions of the crown members for adjusting the imprinting member into operative relation to the inking and record holding members.

In testimony, that I claim the foregoing as my own, I have hereto affixed my signature in the presence of two witnesses.

CHARLES EDGAR DUNLAP.

Witnesses:
E. B. HENSLEE,
E. R. JONES.